Patented Aug. 24, 1937

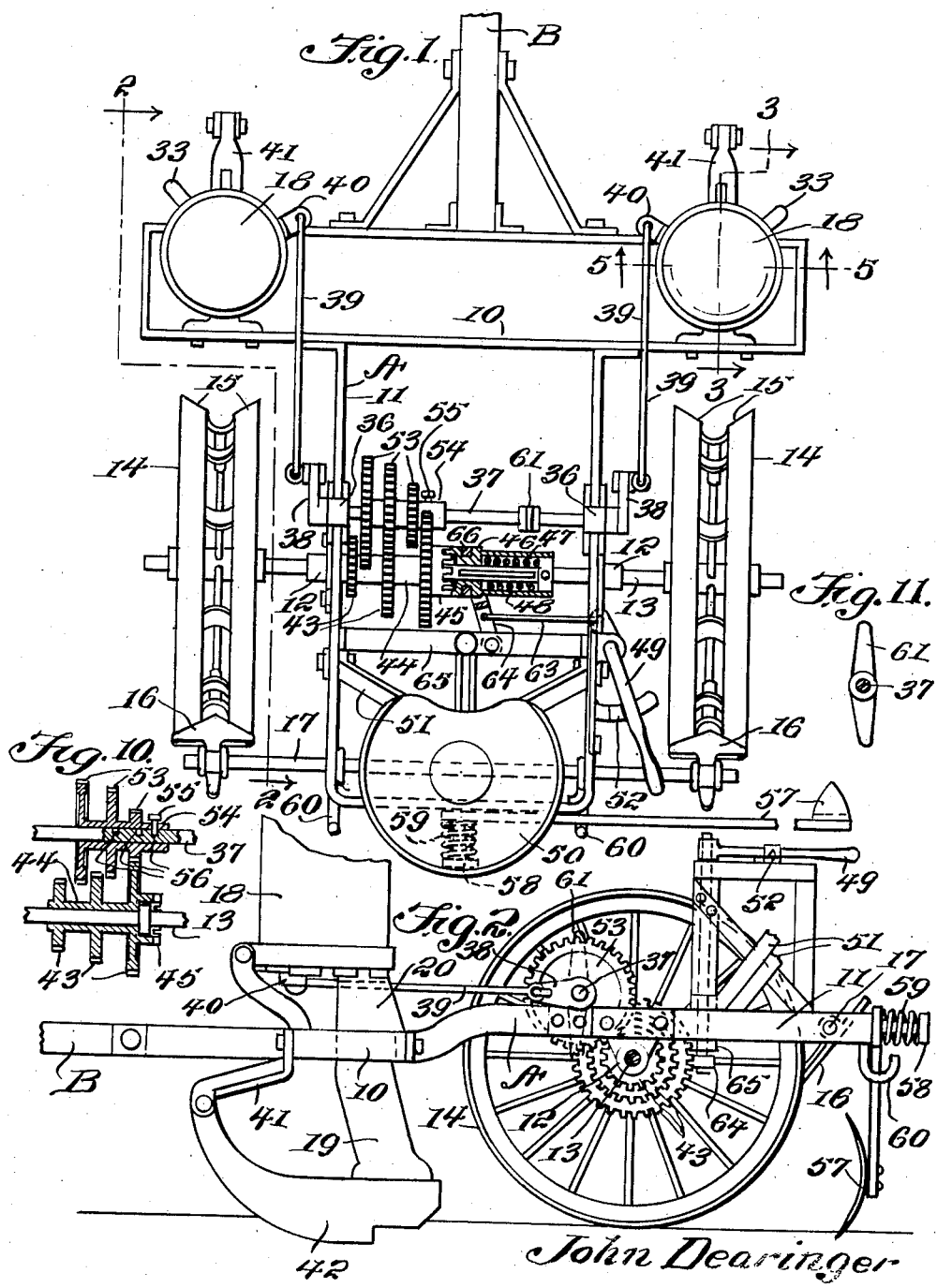

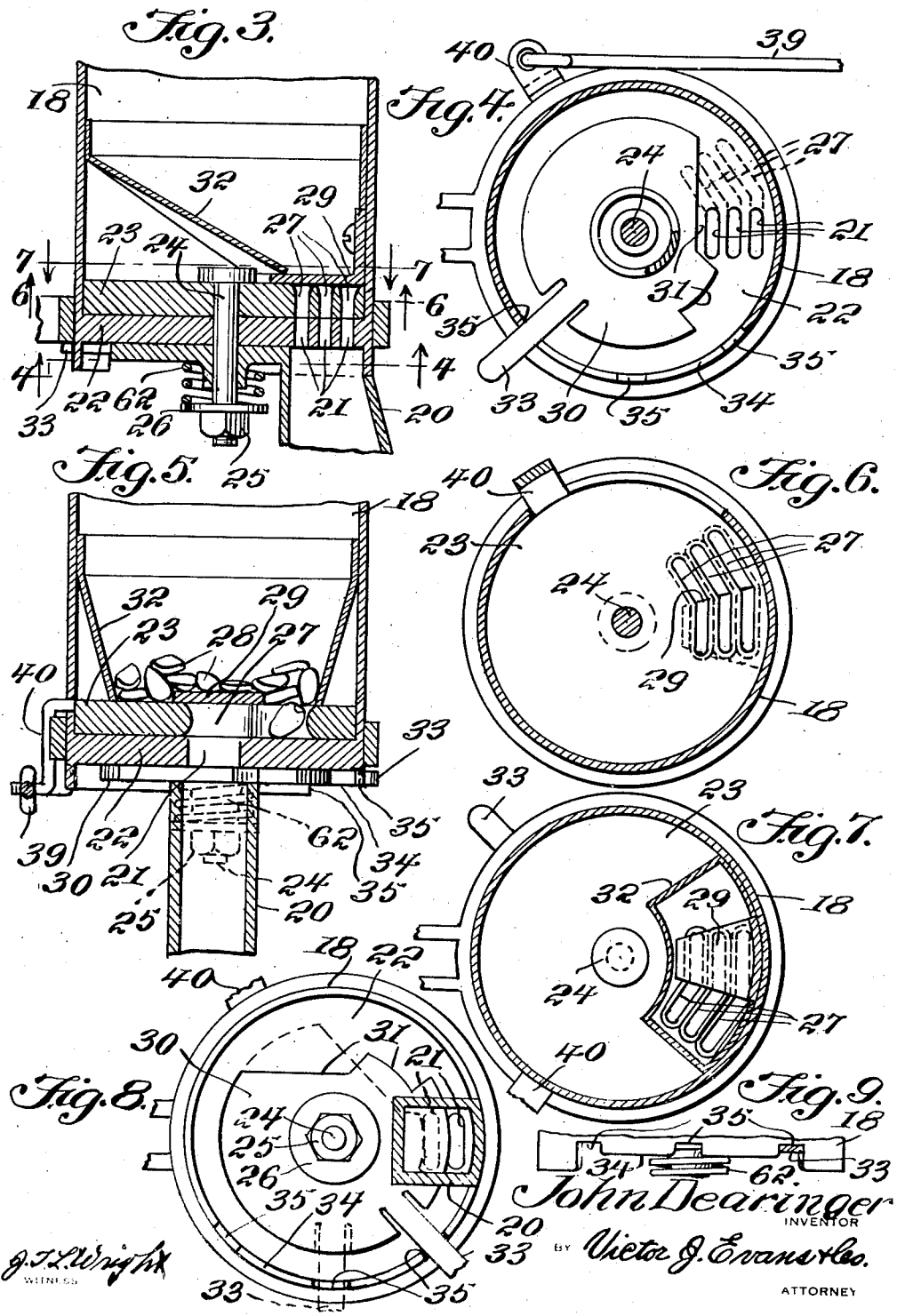

2,091,194

UNITED STATES PATENT OFFICE 2,091,194

CORN PLANTER AND WIRELESS CHECK ROWER

John Dearinger, Versailles, Ind.

Application September 2, 1936, Serial No. 99,108

1 Claim. (Cl. 111—16)

The invention relates to a planting machine and more especially to corn planters of that type known as corn planter and wireless check rowers.

The primary object of the invention is the provision of a planter of this character, wherein seed can be planted in double rows and such seed deposited uniformly at distances apart from each other either close or wide apart according to the check layout for the crop of corn, the machine being of novel construction and is under control of an operator, the planting being automatically effected.

Another object of the invention is the provision of a planter of this character, wherein the seed dropping control in each seed box or hopper is double acting for a sequence of receiving and delivering the corn kernels under each stroke of such control and the kernels of corn can be delivered singly or two or three kernels at a time during the advancement of the machine in its planting operation.

A further object of the invention is the provision of a planter of this character, wherein the rows will be marked without the use of a wire and the row marker being reversible for operation at either side of the line of draft of the machine.

A still further object of the invention is the provision of a planter of this character, wherein the control for the planting of the seed can be driven at different speeds for quick or slow planting of the kernels of corn in the dropping therefrom of the seed boxes or hoppers within a given area and in this manner regulating the distance of the corn plants with respect to each other and for check row planting.

A still further object of the invention is the provision of a planter of this character, which is simple in its construction, thoroughly reliable and efficient in its operation, automatic in the working thereof, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is a top plan view partly is section of the machine constructed in accordance with the invention.

Figure 2 is a sectional view taken on the line 2—2 of Figure 1 looking in the direction of the arrows.

Figure 3 is a fragmentary enlarged sectional view taken on the line 3—3 of Figure 1 looking in the direction of the arrows.

Figure 4 is a sectional view on the line 4—4 of Figure 3 looking in the direction of the arrows.

Figure 5 is a sectional view on the line 5—5 of Figure 1 looking in the direction of the arrows.

Figure 6 is a sectional view on the line 6—6 of Figure 3 looking in the direction of the arrows.

Figure 7 is a sectional view on the line 7—7 of Figure 3 looking in the direction of the arrows.

Figure 8 is a horizontal sectional view through one of the seed hoppers or boxes showing in detail the control for droppings therefrom.

Figure 9 is a fragmentary side elevation of a seed box or hopper.

Figure 10 is a fragmentary detail sectional view showing the gearing train of the machine or planter.

Similar reference characters indicate corresponding parts throughout the several views in the drawings.

Referring to the drawings in detail, the planter or planting machine comprises a main frame A having front laterals 10 while projecting forwardly from the front end of this frame A is a draft pole or beam, a portion thereof being indicated at B, for the hitching of draft animals or a draft machine to said planter for the advancement of the latter through a field or over the ground.

The side sills 11 of the frame A rearwardly of the laterals 10 are built with bearings 12 for a power axle 13 to which are fixed ground wheels 14, these having the dished or substantially V-shaped treads 15 while coacting with these treads are mud scrapers 16 carried by a hanger shaft 17 supported horizontally and fitting the frame A rearwardly of said wheels. Thus mud and other accumulations at the treads 15 of the wheels 14 will be scraped therefrom when the machine is operating. The wheels 14 are inset at opposite sides of the frame A to follow the laterals 10 at the front end of said frame and not to protrude beyond such laterals to opposite sides of the frame.

Fixed to the laterals 10 of the frame A forwardly of the wheels 14 are seed boxes or hoppers 18, these being preferably cylindrical and are arranged upright to rise from the said laterals 10 of the frame. Leading downwardly from the frame A is a delivery boot 19, there being one for each box or hopper and is associated with a discharge spout 20 located at the bottom of said box or hopper in confronting relation to a series of delivering slots or openings 21 formed in the permanent bottom 22 of each box or hopper 18. It is conventional that the boot 19 and spout 20 be unitary and in this instance the same are in this form.

Rotatable within each box or hopper 18 is a disk valve 23 which has its arbor 24 in the form of a bolt extending downwardly through a suitable opening in the bottom 22 and carries a nut 25 and washer 26, respectively, exteriorly from the bottom of the said hopper or box. The valve 23 is formed with the elongated slots 27 which register with the slots or openings 21 and are for receiving and discharging kernels of corn 28 to the slots or openings 21 from within the hopper or box. Within each hopper or box 18 for topping the valve 23 midway between the slots 27 therein is a guard piece 29 which operates in conjunction with the slots 27 so that when these are communicative with the box or hopper at either side of the piece 29 will receive the kernels of corn within such hopper or box and effect delivery thereof through the slots 21 into the spout 20 for dropping within an open furrow in a field. In other words, when the valve 23 is turned in one direction corn kernels 28 will be received in the slots 27 at one side of the piece 29 then on the turning of the said valve in a reverse direction these slots 27 will again receive corn kernels from the box or hopper so that there is a double feed characteristic to each box or hopper for the discharge of the corn kernels in the planting operation of the machine.

Arranged beneath the bottom 22 of each box or hopper 18 is a regulator disk 30 which has the irregularly cut peripheral portion 31 for the purpose of controlling the delivery of seed from the hopper or box 18 to one, two or all of the slots 27 and in this manner controlling the dropping of one kernel, two kernels or three kernels in a single operation and in this fashion the machine will set up delivery singly of kernels or two kernels or three kernels at a time according to the number of slots 27 and the cooperating irregular peripheral formation 31 of the disk 30. The nature of the slots 27 is such that the kernels 28 will be fed or gravitated endwise into the same.

Within each hopper or box 18 directly above the valve 23 is a directional gravitating bar 32 so as to direct the contents of the hopper or box in the direction of the slots 27 and thus feeding the same to the point for discharge or delivery of the kernels of the corn directly to the said slots 27 in the valve 23.

Each disk 30 is formed with a handle 33 which protrudes through a way 34 and intersecting this way are rest seats 35 for the handle 33 so that such handle will be latched and in this manner the disk 30 held in its manually adjusted position to control the feeding of the kernels of corn singly or in groups of two or three at a time from the hopper or box 18.

The frame A is built with bearings 36 for a rotatably driven crank shaft 37, its cranks 38 being pivotally connected with reciprocating pitmans or links 39, these being pivotally or loosely connected to ear or arm extensions 40 on the valves 23 so that when the said shaft 37 is rotated the said valves 23 will be reversely turned in unison with each other. In other words, the valve 23 will rotate in one direction through one stroke of the pitmans or links 39 and in a reverse direction through the reverse stroke of said pitmans or links.

Arranged fore of the boots 19 and carried by the frame A are hangers 41 for furrow openers 42 which open the furrows in the ground for the kernels of corn planted by the machine. The treads 15 of the wheels constitute furrow closers so that the open furrows will be closed subsequent to the dropping of the corn into the open furrows when the machine is advanced over the ground.

Loose upon the axle 13 is a series of variable speed gears 43 in unity with a hub 44, it having a clutch head 45 companion to a slidable clutch head 46 splined at 47 on the said axle 13 for displacement thereon whereby the said gears 43 can be clutched or unclutched to and from the said axle. Coacting with the head 46 is a tensioning spring 48 which urges the head 46 in clutched engagement with the head 45. This head 46 is operated from a control lever 49 having connection therewith and arranged next to an operator's seat 50 upon a seat support 51 equipped or built with the frame A. The control lever 49 coacts with a keeper 52 so that it may be latched in a position to hold the head 46 disconnected from the head 45 and thus the gears 43 unclutch and free from driving thereof by the axle 13.

Adjustably fitting the shaft 37 is a series of speed changing gears 53, these being in unity with a hub 54 which is adjustable on the shaft 37 and held in adjusted position by a set screw 55 selectively engageable in sockets 56 in the said shaft 37. Thus through adjustment of the gears 53 the speed of action of the valves 23 can be regulated for quick, slow or intermediate speed planting operation of the machine.

Arranged at the rear end of the frame A is an adjustable and reversible row marker 57 which is manually adjustable to either side of the machine frame A for check row marking purposes. The marker 57 swings on a mounting 58 equipped with a spring 59 for permitting the clearing of the seat 50 when such marker is reversed to either side of the machine. This marker when in marking position is held in a rack 60 built with the frame A of the machine at the rear end of the said frame.

On the shaft 37 is an indicator 61 in the form of a pointer which when in upright position or perpendicular will signify the position of the valves 23 within the boxes or hoppers 18 under the double action thereof for receiving and delivering kernels of corn in the planting operation of the machine. The indicator 61 is of the double pointer type so that the points thereof identify the direction of strokes to the valves 23 in the working of the same.

Each disk 30 is acted upon by a coiled tensioning spring 62 carried by the bolt 24 so as to hold the handle 33 of such disk yieldably engaged in a selected seat 35. The disk 30 is loose between the bottom 22 of the hopper or box 18 and its companion spout 20 and boot 19. The gears 43 and 53 cooperate with each other for submitting power from the axle 13 to the shaft 37 for the operation of the pitmans or links 39 in actuating the valves 23 within the hoppers or boxes 18 of the planter.

The lever 49 operating the head 46 includes the connections 63 and 64, respectively, the latter connection being in the form of a fork or yoke pivoted to the frame A at the cross brace 65 and also pivoted to a clutch head ring 66 rotatably fitted with the head 46, while the connection 63 is in the form of a pivot link.

Each disk 30 is manually set to regulate the number of kernels of corn to be delivered from the box or hopper 18 while the valves 23 time the delivery of such kernels in the planting operation of the machine.

The change gears 53 are manually shifted and fastened in adjusted position so as to vary the speed of action of the valve 23 working within the seed boxes or hoppers 18.

By reason of the disposition of the guard pieces 29 each in the box or hopper assures a double distributing action with the companion valve 23 during the working of the machine.

What is claimed is:

In a check row planter, a wheeled frame, a rotary axle in the frame for supporting the wheels thereof, seed dropping mechanism on said frame, a double crank shaft journaled in the frame parallel with the axle, a plurality of gears shiftably fixed to the crank shaft, connections between the cranks of said crank shaft and the seed dropping mechanism for the operation of the latter, a plurality of gears loose on the axle and selectively engaged by one of the first-mentioned gears, and a hand operable clutch fitted with the axle and engageable with the loose gears for the turning thereof with said axle.

JOHN DEARINGER.